(12) United States Patent
Närvä

(10) Patent No.: US 6,384,813 B1
(45) Date of Patent: May 7, 2002

(54) TWO-PART ELECTRONIC DEVICE

(75) Inventor: Juha Närvä, Lempäälä (FI)

(73) Assignee: Nokia Mobile Phones Limited, Espoo (FI)

( * ) Notice: Subject to any disclaimer, the term of this patent is extended or adjusted under 35 U.S.C. 154(b) by 0 days.

(21) Appl. No.: 09/338,652

(22) Filed: Jun. 23, 1999

(30) Foreign Application Priority Data

Jun. 30, 1998 (FI) .................................................. 981509

(51) Int. Cl.$^7$ ................................................ G09G 5/00
(52) U.S. Cl. ......................................................... 345/173
(58) Field of Search ................................ 345/175, 156, 345/157, 169, 173, 901; 379/58, 110; 361/681, 679

(56) References Cited

U.S. PATENT DOCUMENTS

| | | | |
|---|---|---|---|
| 5,117,073 A | 5/1992 | Mischenko | 200/61.7 |
| 5,138,329 A | 8/1992 | Saarnimo et al. | 343/702 |
| 5,148,471 A | 9/1992 | Metroka et al. | 379/58 |
| 5,168,982 A | 12/1992 | Hakanen et al. | 200/342 |
| 5,175,759 A * | 12/1992 | Metroka et al. | 379/58 |
| 5,189,632 A | 2/1993 | Paajanen et al. | 364/705.05 |
| 5,266,949 A | 11/1993 | Rossi | 341/22 |
| 5,337,346 A * | 8/1994 | Uchikura | 379/58 |
| 5,408,060 A | 4/1995 | Muurinen | 200/314 |
| 5,436,954 A * | 7/1995 | Nishiyama et al. | 379/58 |
| 5,584,054 A | 12/1996 | Tyneski et al. | 455/89 |
| 5,646,649 A | 7/1997 | Iwata et al. | 345/173 |
| 5,790,875 A | 8/1998 | Andersin et al. | 395/750.03 |
| 5,805,084 A | 9/1998 | Mannisto | 341/22 |
| 5,827,082 A | 10/1998 | Laine | 439/165 |
| 5,877,709 A | 3/1999 | Ala-Lehtimaki et al. | 341/26 |
| 5,905,235 A | 5/1999 | Charman | 200/5 A |
| 6,020,878 A * | 2/2000 | Robinson | 345/173 |
| 6,163,326 A * | 12/2000 | Klein et al. | 345/163 |

FOREIGN PATENT DOCUMENTS

| | | |
|---|---|---|
| EP | 0 534 478 A3 | 3/1993 |
| EP | 0 607 038 A1 | 7/1994 |
| EP | 0 807 879 A2 | 11/1997 |
| WO | WO 98/15094 | 4/1998 |

OTHER PUBLICATIONS

Finnish Official Action.

* cited by examiner

Primary Examiner—Richard Hjerpe
Assistant Examiner—Ronald Laneau
(74) Attorney, Agent, or Firm—Perman & Green, LLP

(57) ABSTRACT

An electronic device (10) comprising a first part (110) comprising at least a first key (111) for effecting at least one key function of the electronic device; a second part (120) comprising a second key (121) for effecting at least one key function of the electronic device; and a hinge (130) for fixing the first part (110) and the second part (120) turnably to each other, and in relation to which hinge said first and second part can be closed against each other and opened. The first key (111) and the second key (121) have been arranged to be simultaneously activated in order to indicate the closing against each other of the first part and the second part. The status indication is thus generated by reorganizing existing resources and no new components need to be added.

9 Claims, 3 Drawing Sheets

TWO-PART ELECTRONIC DEVICE

FIELD OF THE INVENTION

The present invention relates to electronic devices and in particular an electronic device comprising a first part comprising a first key for effecting at least one key function of the electronic device, a second part comprising a second key for generating at least one key function of the electronic device, a hinge for turnably fixing the first and second pan to each other, and in relation to which hinge said first and second part can be closed against each other and opened.

BACKGROUND OF THE INVENTION

Many electronic devices consist of two parts fixed to each other using a hinge. The hinged parts can be closed against each other and when opened the parts are held together by the hinge. This construction facilitates the devices to be conveniently portable, as the means that are to be activated can be arranged to be in the sides which remain inside when the parts are closed (the insides of the parts), and rigid sides can be arranged on the sides which remain outside when the parts are closed (the outsides of the parts). When the parts are closed against each other the pans to be activated remain protected from external contact and the outside walls form a protective case for the device. If the device or at least some of its functions are intended to be used also when on the move, it is possible to arrange to the outside of the parts a user interface required for controlling these functions and other parts can be covered inside the device by closing the parts against each other. Such a solution has been used e.g. in Nokia's communicators (Nokia 9000, Nokia 9110) which comprise two parts fixed to each other using a hinge. On the inside surface of the parts it has been arranged a PDA (Personal Digital Assistant)—interface and on the outside surface a mobile station user interface.

It is often preferable to change the operating mode of such an electronic device according to whether the parts of the device are closed against each other (the device is closed) or not (the device is open). When the device is closed the power consuming functions inside can be switched off to save power or they can be maintained in a power saving mode. If the user interfaces both inside and outside the device are used to control at least partly the same functions their joint control can also be changed according to whether the device is open or closed. For example in such a device as the Nokia Communicator (Nokia 9000, Nokia 9110) the inside LCD (Liquid Crystal Display)—display can be switched off when the device is closed. It is also possible to alter the multiplexing of the key signals of the user interfaces on the inside and outside surfaces according to whether the device is open or closed.

In order to achieve such changes of mode it is required an information about the state of the device, i.e. whether the device is open or closed at the moment. However, the size on most electronic devices and that of portable devices in particular has to be optimized to be as small as possible, and accordingly the components used for the status indication should be as small, light and few as possible to save space on printed circuit boards. On the other hand the indication should be reliable, because an erroneous indication may prevent the use of the whole device.

Reference publication U.S. Pat. No. 5,148,471 describes a portable radio telephone in which the position of a key-flap moving on a hinge is detected using a separate switch construction placed in the hinge between the flap and the body of the telephone. When the opening angle of the flap exceeds a certain threshold value the switch is closed and the information about the position of the flap is transferred to the control unit of the device. Such a detection of the positions of parts requires the use of additional component which is not preferable. Further, a realization carried out in a hinge is exposed to damage due to the strain caused by movement and thus increases the sensitivity to faults of the device.

Reference publication U.S. Pat. No. 5,337,436 describes a portable telephone device comprising also an electronic notebook. In the device in order to achieve a status indication it has been added next to a normal keyboard an additional mode detection key which is pushed down when the normal keyboard is closed using a lid. This solution however requires adding an extra key in the device for status indication only.

In the present Nokia Communicators (Nokia 9000, Nokia 9110) the mode indication is generated by using in the base part of the device a relay placed inside a thin glass tube, which relay reacts to a magnet placed in a matching position in the lid part. The realization of the arrangement thus requires additional components, which exposes to component faults, increases the weight of the device and consumes circuit board space. Further, the solution is sensitive to a successful placing in the assembly stage.

SUMMARY OF THE INVENTION

Now such an electronic device has been invented, by using which the impact of the above disadvantages is reduced. A device according to the invention is characterized in that said first key and second key have been arranged to activate simultaneously in order to indicate the closing of the first and part against each other.

The object of the invention is also an electronic device according to claim 9 comprising a first part comprising a first key in order to achieve at least one key function of the electronic device, a second part comprising a second key in order to achieve at least one key function of the electronic device; a hinge in order to fix the first and second part turnably to each other, and in relation to which hinge said first and second part can be closed against each other and opened. Said device is characterized in that said first key and second key have been arranged to activate simultaneously when the first and second part are closed against each other; and said first and second key have been arranged to be released simultaneously when the first and second part are opened.

In the invention the information of the status of the parts of the device is achieved by indicating the closing by two normal keys activating simultaneously when the parts are closed against each other. Correspondingly the opening of the parts is indicated by the releasing of at least one of the keys reserved for the status indication. The status indication is in this way generated by rearranging existing resources and there is no need to add new components. A solution according to the invention saves space on printed circuit boards and reduces the possibility of manufacturing faults. At the same faults caused by the wear of a separate detector are avoided.

The invention is described in detail in the following with reference to enclosed drawings, of which

BRIEF DESCRIPTION OF THE DRAWINGS

FIG. 1b presents another projection of the device according to FIG. 1a;

DETAILED DESCRIPTION

Figure 1A:
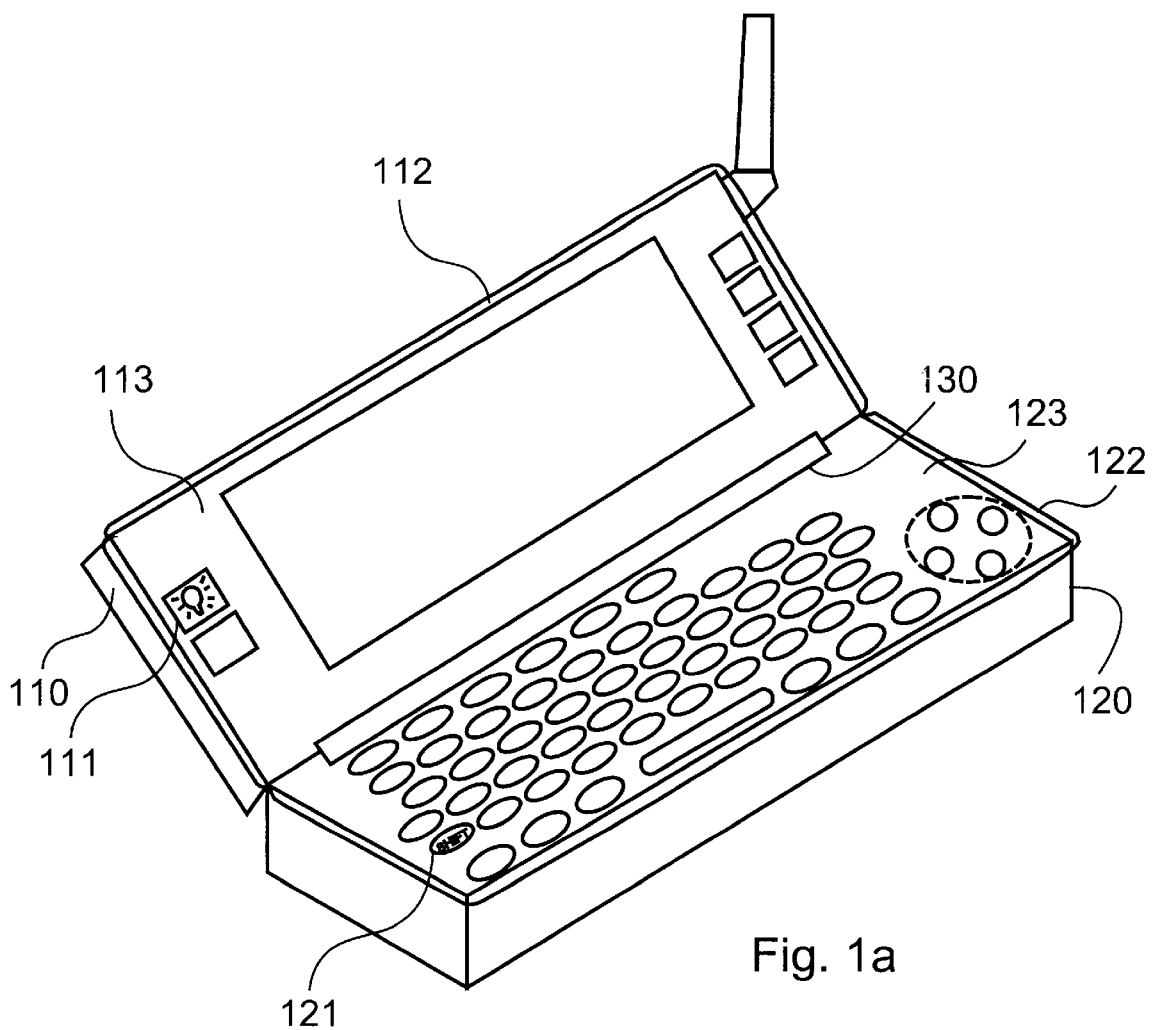
FIG. 1a presents an electronic device according to the invention.

FIG. 1a presents an electronic device according to the invention, i.e. mobile station 100. Said mobile station comprises first part 110 and second part 120. First part 100 and second part 120 have been fixed turnably to each other using hinge 130 consisting of one or more parts, which hinge consists of a joint joining two parts to each other. Such a joint is for example a normal hinge comprising a normal pivot axis or a joint consisting of elastic fixing strips connected between the parts. First part 110 comprises at least first key 111 for generating a key function connected with the operating of the device. Correspondingly, second part 120 comprises at least second key 121 for achieving a key function connected with the operating of the device. Said keys can be connected with an independent key function or they can be used to generate a key function by activating the key simultaneously with another key. Both the first and second part typically comprise in addition to the first and second key several other keys connected with the operating of the device.

First pad 110 of the device comprises contact surface of the first part 112 and second part 120 comprises contact surface of the second part 122. Contact surfaces 112 and 122 have been arranged to be matching in relation to each other in such a way that they can be placed immediately against each other by turning first part 110 and second part 120 in relation to hinge 130.

Figure 1B:
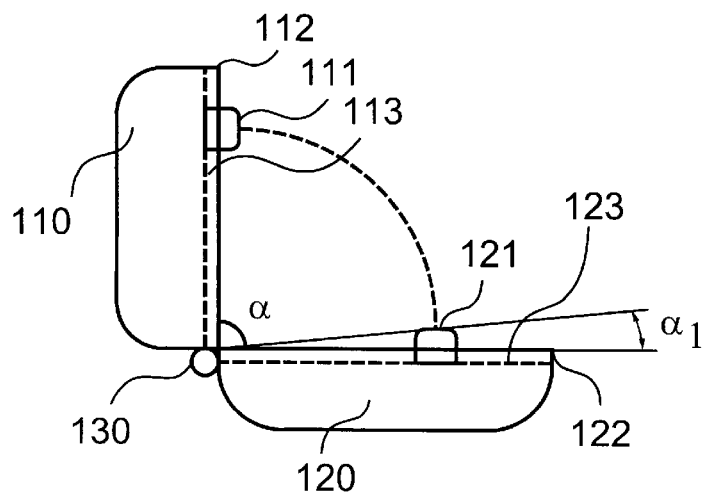

When contact surface 112 of the first part and contact surface 122 of the second part are set directly against each other, inner surface of the first part 113 defined by hinge 130 and contact surface of the first part 112 and inner surface of the second part 123 defined by hinge 130 and contact surface of the first part 122 are against each other but they do not essentially touch each other. The sides of the opening angle α of the device are formed between straight lines drawn between hinge 130 and, perpendicularly to the hinge, to contact surface of the first part 112 and to contact surface of the second part 122 as shown in FIG. 1b. The first and the second part are interpreted to be closed at least when contact surface of the first part 112 and contact surface of the second part 122 have been set immediately against each other. It can be chosen that the first and second part can be determined to be closed also when the opening angle α of the device is smaller than preset threshold value $α_1$.

First key 111 and second key 121 of a device according to the invention have been arranged to activate simultaneously when first part 110 and second part 120 are closed against each other. It is possible to realize this in the way illustrated in FIG. 1b by placing the keys to be suitably protruding and opposite to each other in such a way that when the first and second part are closed against each other the keys are pressed against each other and effect the key function implemented by activating them simultaneously.

One of the ways to realize this is to arrange the sum height of first key 111 and second key 121 in relation to the inner surfaces of the first part 113 and of the second part 123 respectively bigger than the sum height of the contact surface of the first part 112 and the contact surface of the second part 122 in relation to the inner surfaces of the first part 113 and of the second part 123 respectively. When first 110 and second part 120 are closing against each other the first key and the second key press against each other and activate a simultaneous key function. The sum height of other keys possibly ending up opposite to each other is respectively smaller than the sum height of contact surface of the first part 112 and the contact surface of the second part 122 in relation to the inner surfaces of the first part 113 and of the second part 123, in which case when the lid is closed other keys are not activated unnecessarily. The key combination has naturally to be chosen in such a way that it is not needed for forming other key functions and preferably even in such a way that the activating of it by mistake does not occur too easily. In the example in FIG. 1a the first key is the switch key of the display background light of the display placed in the first part and the second key is the SHIFT-key of the keyboard placed in the second part. Other combinations chosen in a suitable way are also possible.

Figure 2:
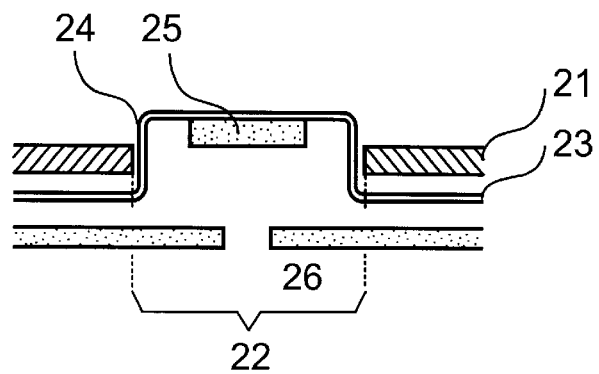
FIG. 2 illustrates a realization of a first key.

FIG. 2 illustrates a realization of first key 111. The first key comprises part 24 of keypad mat 23 formed of an elastic material which has been pushed in through aperture 22 left in fixed cover 2. Under the protruding part of the keypad mat it has been fixed part 25 made of conductive material. On the corresponding place under the keypad mat there is open circuit 26. When a user pushes part 24 of the keypad mat (key 111) protruding through aperture 22 the part is pushed down because of its elasticity and part 25 made of conductive material closes circuit 26 and causes a pulse triggering a keypad function. When according to the invention two such keys are pushed against each other the key functions of both are activated simultaneously.

Silicon is generally used as the material of keypad mats because of its preferable elasticity and wear properties. Because in an arrangement according to the invention keys may be pressed together even for long periods, the loss of elasticity can be prevented by using a thin metal foil in the first or second or both keys at least in protruding part 34.

Figure 3:
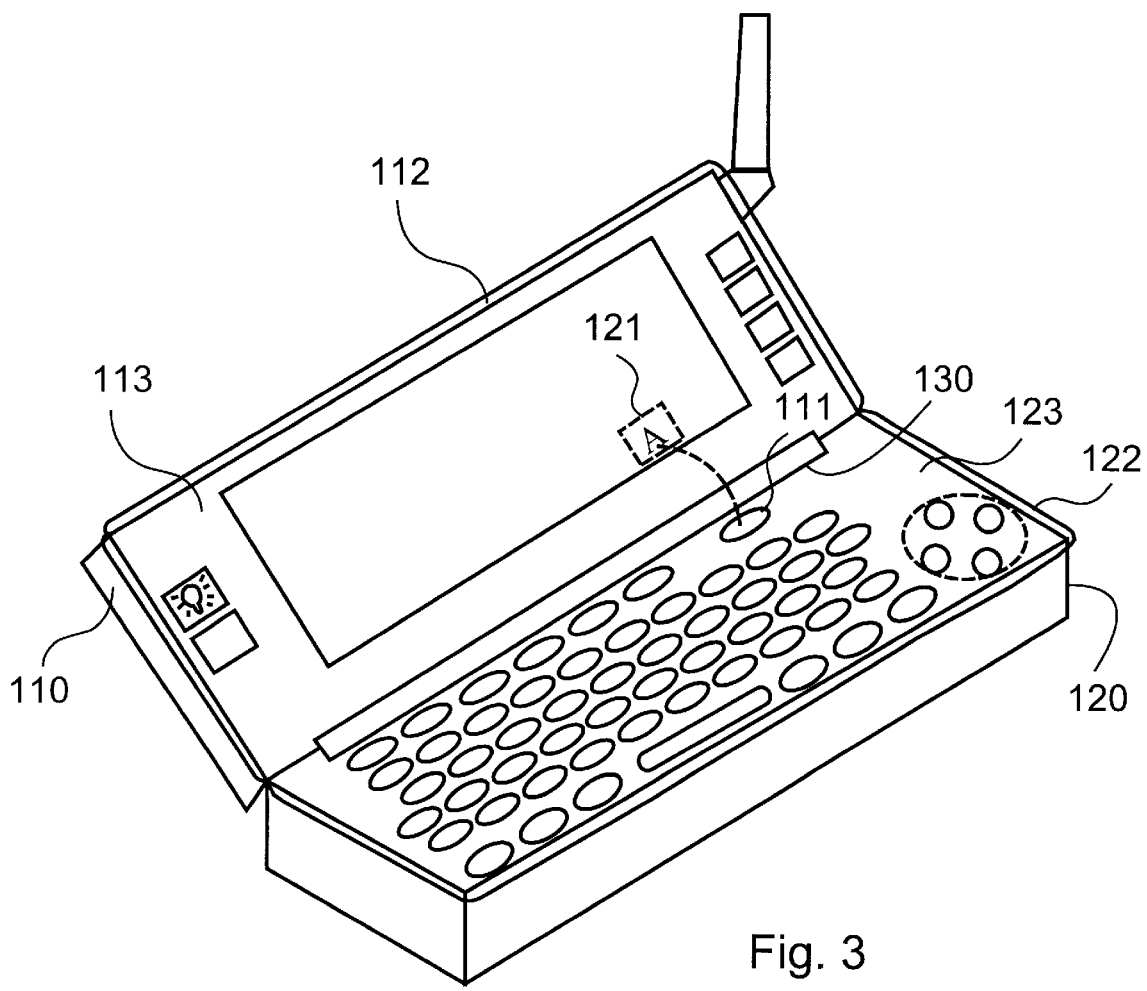
FIG. 3 illustrates a preferable embodiment of the invention in which at least one of the keys is a part of a touch-display.

In electronic devices such touch-displays are also widely used in which a contact touching the surface of the display initiates a function responding to the activation of the point in question. A preferable embodiment of the invention in which at least one of the keys is such a part of a touch-display is illustrated in FIG. 3.

First part 110 of the device shown comprises touch-display 31, on the surface of which it has been arranged section A which forms first key 111. Second part 120 comprises second key 121 which has in the above described way been arranged to be higher than the other keys. When the parts are closed against each other second key 121 is pushed against section A of the display activating a simultaneous key function indicating that the device is closed. When the device is opened the simultaneous activating of the keys ends.

Figure 4:
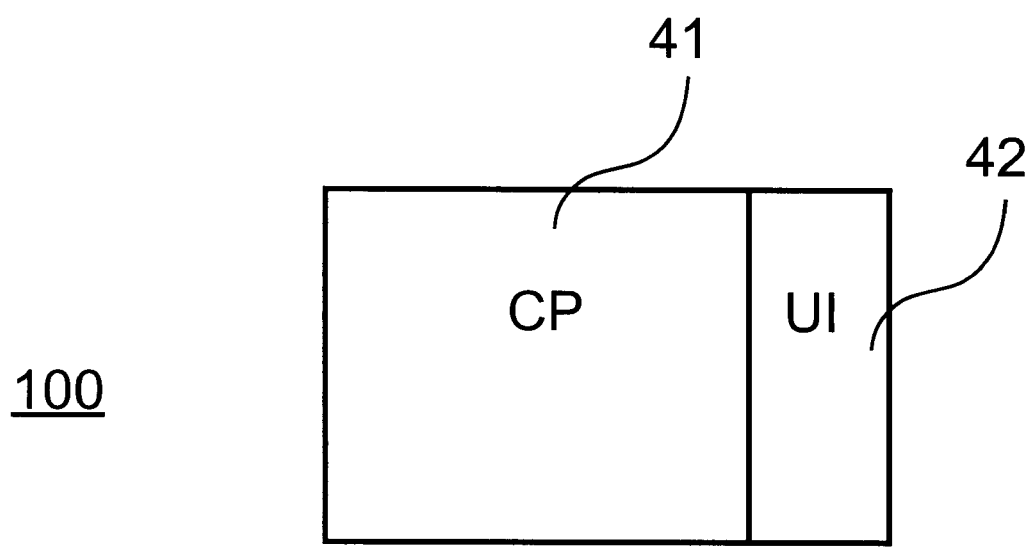
FIG. 4 presents a functional block diagram of an electronic device according to the invention.

FIG. 4 shows a functional block diagram of an electronic device 100 according to the invention, which device has at least two operating modes different from each other. Device 100 comprises control unit 41 for controlling the functions of the device and user interface 42 for outputting functions connected with the operating of the device to a user and for inputting commands given by the user to control unit 41. Said electronic device goes over from one operating mode to another based upon a status indication obtained from user interface 42.

The status indication of said electronic device 100 has been realized with a method according to the invention. When the device is open first key 111 and second key 121 are not against each other and they are not activated simultaneously and the device is operating in a first operating mode. The keys can be used to realize functions in a normal way. When the device is closed the keys are pushed against each other and they are activated simultaneously generating a status indication indicating the closing of the device. As a response to the status indication generated by keys 111 and 121 control until 41 of the device switches the device into a second operating mode in which for example several functions remaining inside the device can for the reasons of saving current be switched over to a current save-mode on be entirely switched off.

The above is a description of the realization of the invention and its embodiments utilizing examples. It is self evident to persons skilled in the art that the invention is not limited to the details of the above presented examples and that the invention can be realized also in other embodiments without deviating from the characteristics of the invention. The presented embodiments should be regarded as illustrating but not limiting. Thus the possibilities to realize and use the invention are limited only by the enclosed claims. Thus different embodiments of the invention specified by the claims, also equivalent embodiments, are included in the scope of the invention.

What is claimed is:

1. An electronic device comprising:
    a first part comprising a first key for effecting at least one key function of the device;
    a second part comprising a second key for effecting at least one key function of the device;
    a hinge for fixing the first part and the second part turnably to each other, and in relation to which the first part and second part can be turned into a first position and into a second position;
    wherein
        the first key and second key are arranged to automatically activate simultaneously when the device is turned into the first position for indicating that the device is in the first position.
2. A device according to claim 1, wherein
    in the first position the first and second part of the device are closed against each other; and
    said first key and second key are arranged to activate simultaneously when they are pushed together as a response to the closing of the first part and the second part against each other.
3. A device according to claim 2, wherein
    the first part of the device comprises a contact surface of the first part and an inner surface of the first part defined by said contact surface of the first part and the hinge;
    the second part of the device comprises a contact surface of the second part and an inner surface of the second part defined by said contact surface of the second part and the hinge;
    the height of the first key in relation to the inner surface of the first part added to height of the second key in relation to the inner surface of the second part is bigger than the height of the contact surface of the first part in relation to the inner surface of the first part added to the height of the contact surface of the second part in relation to the inner surface of the second part,
    the first key and the second key have been matched together in the opposite parts in such a way that the keys are pushed against each other and activated simultaneously when the first and the second part are turning to the first position.
4. A device according to claim 1, wherein at least one of the first and second keys comprises a part of a touch-sensitive display.
5. A device according to claim 1, wherein part of the keypad mat of at least one of the first key and the second key, comprises designed metal foil.
6. A device according to claim 1, wherein the device has a first operating mode and a second operating mode, and the device further comprises:
    a user interface for generating a first status indication as a response to a key function effected by simultaneously activating the first and second keys, said first key and second key being arranged to activate simultaneously when the first part and the second part are turning into the first position; and
    a control unit which switches the electronic device to said first operating mode as a response to receiving the first status indication.
7. A device according to claim 6, wherein
    said user interface has been arranged to give the control unit a second status indication as a response to the ending of the simultaneous activating of the first and second key, the activation of said first and second key being arranged to end immediately when the first part and the second part are turning into the second position; and
    said control unit has been adapted to switch the electronic device into the second operating mode as a response to receiving said second status indication.
8. A device according to claim 1, wherein at least one of the first and second keys has been arranged to be released when the first part and the second part are turning into the second position.
9. An electronic device comprising:
    a first part comprising a first key for effecting at least one key function of the device;
    a second part comprising a second key for effecting at least one key function of the device;
    a hinge for fixing the first part and the second part turnably to each other, and in relation to which the first and second part can be turned into a first position and into a second position;
    wherein
        the first key and second key are arranged to automatically activate simultaneously when the first part and the second part are being turned into the first position; and
        as a response to the first part and the second part being turned into the second position the activation of at least one of the first key and the second key is automatically released and as a response thereto the device has been arranged to indicate that the device is in the second position.

* * * * *